3,553,237
PROCESS FOR THE PREPARATION OF $\Delta^{4,7}$-3-KETO-STEROIDS

Max Salomon de Winter, Oss, Netherlands, assignor to Organon Inc., West Orange, N.J., a corporation of New Jersey
No Drawing. Filed Mar. 18, 1968, Ser. No. 714,080
Claims priority, application Netherlands, Mar. 31, 1967, 6704679
Int. Cl. C07c *169/22*
U.S. Cl. 260—397.3      1 Claim

ABSTRACT OF THE DISCLOSURE

The present invention relates to an improved process for the conversion of $\Delta^{4,6}$-3-keto-steroids into $\Delta^{4,7}$-3-keto-steroids by reaction with a base in the presence of liquid ammonia.

---

The invention relates to an improved process for the conversion of $\Delta^{4,6}$-3-keto-steroids into $\Delta^{4,7}$-3-keto-steroids.

$\Delta^{4,7}$-3-keto-steroids are in themselves important biologically active compounds, but they are also valuable as intermediate products for the manufacture of in ring A aromatic $\Delta^{7}$-steroids, such as equilin.

A known method for the manufacture of the said compounds consists in that a $\Delta^{4,6}$-3-keto-steroid is reacted with a metal alkoxide, such as potassium t.butoxide in the presence of dimethyl sulphoxide or dimethylformamide (see U.S. Pat. 3,272,847). On adopting this method it appeared that the desired $\Delta^{4,7}$-3-keto-steroid is isolated with great difficulty from the thus obtained reaction product, and that in poor yield.

An improved process has now been found for deconjugating $\Delta^{4,6}$-3-keto-steroids, which method gives much higher yields, and consists in that a $\Delta^{4,6}$-3-keto-steroid is treated with a base in the presence of liquid ammonia.

The $\Delta^{4,6}$-3-keto-steroid to be employed as starting product may belong to the oestrane, androstane, pregnane, or other steroid series. An important group for the manufacture of equilin and derivatives thereof is the one of the formula:

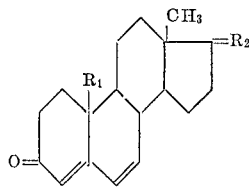

in which:

$R_1$=H, $CH_3$, $CH_2OR$, or COOH, in which R is hydrogen, or an ester or ether group, and
$R_2$=a keto group, or a free, etherified or esterified hydroxyl group.

The compound to be used in the present process as a base may be an alkali metal amide, a metal salt of an organic carboxylic acid, such as potassium acetate, a metal hydride, or a metal alkoxide, such as sodium methanolate, aluminium isopropylate, or potassium t.butylate. Preferably an alkali metal amide or a metal alkoxide is applied, of which in particular sodium amide.

The process is usually performed by adding the steroid to a mixture of liquid ammonia and the base applied, if required, dissolved or suspended in an organic liquid, after which the reaction mixture is stirred for some time, varying from a few minutes to a few hours, whereupon the resulting reaction product is decomposed by adding an acid which is strong in ammoniacal medium, such as an ammonium salt, for example ammonium chloride, an alcohol, water, and the like. Preferably the ammonium salts to be applied for the decomposition are added as such to the ammoniacal reaction mixture, but they may also be prepared in situ by adding the relative acid to the ammoniacal mixture.

The quantities of liquid ammonia and base are not tied to strict limits, but usually the quantity of liquid ammonia amounts to some 15 to 100 u. of volume per u. of volume of $\Delta^{4,6}$-3-keto-steroid, the quantity of base usually amounting to at least two equivalents calculated on the metal.

The thus obtained $\Delta^{4,7}$-3-keto-steroids can in themselves be applied therapeutically, but they may also serve as starting product in the manufacture of other biologically active steroids, for example $\Delta^{1,3,5(10),7}$-oestratetraene-steroids, such as equilin, by any method known per se.

The invention is further illustrated by the following examples:

EXAMPLE I

To a solution of 8 gm. of sodium in 1500 ml. of liquid ammonia was added 50 mg. of ferric nitrate. After some time the blue coloured mixture turned grey. To the thus prepared sodium amide solution was added 50 gm. of $\Delta^{4,6}$-3,17-diketo-19-hydroxy - androstadiene, after which the mixture was stirred for 15 minutes at a temperature of $-33°$ C. Then the reaction was stopped by adding 30 gm. of ammonium chloride. The ammonia was evaporated while adding ether so that the volume remained practically the same. The etherial solution was taken up in a mixture of water and chloroform, after which the organic layer was separated. The water layer was extracted a few times with chloroform, after which the organic layers were combined, washed until neutral, dried on sodium sulphate, treated with active carbon, and evaporated to dryness. Then the residue was recrystallised from a mixture of methylene chloride and acetone to obtain 38 gm. of $\Delta^{4,7}$-3,17-diketo-19-hydroxy-androstadiene. Melting point: 218–220° C.; $\epsilon240\mu=14,800$.

In the same manner the $\Delta^6$-19-nor-testosterone and the $\Delta^{4,6}$-3-keto-17$\beta$-acetoxy - androstadiene were converted into the corresponding $\Delta^{4,7}$-3-keto-steroids by means of sodium methanolate and potassium methanolate respectively in liquid ammonia, the reaction being stopped by means of ethanol and ammonium acetate respectively.

Comparative test by the conventional method

To a suspension of 30 gm. of sodium methylate in 90 ml. of dimethyl sulfoxide was added 10 gm. of $\Delta^{4,6}$-3,17-diketo-19-hydroxy-androstadiene. After stirring for 15 minutes the mixture was poured into 2 l. of 2 N hydrochloric acid. The aqueous mixture was extracted three times with chloroform, after which the combined extracts were washed until neutral, dried on sodium sulphate and evaporated to dryness in vacuo. From the residue, which according to thin layer chromatography should contain some 5 to 10% of the desired $\Delta^{4,7}$-compound, no pure product could be isolated, neither by crystallisation nor by chromatography.

Even poorer results were obtained with sodium amide instead of sodium methylate.

EXAMPLE II

To a sodium amide solution prepared from 1.5 gm. of sodium in 300 ml. of liquid ammonia a solution was added of 10 gm. of $\Delta^{4,6}$-3-keto-17$\beta$,19-dihydroxy-androstadiene-17$\beta$-benzoate in 100 ml. of dry tetrahydrofuran, after which the mixture was stirred for 25 min. at $-40°$ C. Then the reaction was stopped by adding 6 gm. of ammonium acetate, after which the mixture was treated further by the process described in Example I to obtain 5.95 gm. of $\Delta^{4,7}$-3-keto-17$\beta$,19-dihydroxy-androstadiene-17-benzoate.

$\epsilon 234\mu = 24{,}600$.

In the same manner the $\Delta^6$-progesterone and the $\Delta^{4,6}$-3-keto-19-hydroxy-cholestadiene were converted into the corresponding $\Delta^{4,7}$-3-keto-steroids.

I claim:

1. The process which comprises reacting a $\Delta^{4,6}$-3-keto-steroid of the formula:

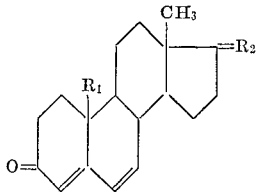

wherein $R_1$ is selected from the group consisting of H, $CH_3$, and $CH_2OH$, and $R_2$ is selected from the group consisting of a keto group, a hydroxyl group, and an esterified hydroxyl group, with a base in the presence of liquid ammonia to form an enolate and then decomposing the enolate thus formed by adding a compound which acts as a strong acid in an ammoniacal medium to yield the corresponding $\Delta^{4,7}$-3-keto-steroid.

References Cited
UNITED STATES PATENTS 3,272,847  9/1966  Irving et al.
3,325,519  6/1967  Kruger.

HENRY A. FRENCH, Primary Examiner

U.S. Cl. X.R.

260—397.1, 397.2, 397.4